Patented July 15, 1947

2,423,947

UNITED STATES PATENT OFFICE 2,423,947

CATALYTIC REFORMING PROCESS

Edgar C. Pitzer, Chicago, Ill., assignor to Standard Oil Company, Chicago, Ill., a corporation of Indiana No Drawing. Application April 30, 1941,
Serial No. 391,216

7 Claims. (Cl. 196—50)

This invention relates to a process of converting hydrocarbons and in particular low knock rating gasoline and naphthas into high knock rating gasoline motor fuel by contacting the hydrocarbon vapors at high conversion temperatures with porous, solid, refractory catalysts. The invention relates more particularly to the conversion of naphtha vapors with alumina-containing catalysts in which the alumina is present in a particular form having a higher catalytic efficiency than, and other advantages over, the numerous catalysts heretofore employed.

One object of the invention is to provide a catalytic process for the treatment of naphtha vapors which will effectively convert low knock rating naphthas into high knock rating gasoline at high contacting rates or, in other words, high space velocities. Another object of the invention is to provide a catalytic process using a new catalyst which will produce a product having a higher knock rating than that obtainable with catalysts known heretofore. Still another object of the invention is to provide a naphtha reforming catalyst which will retain its effectiveness over a longer period of time than catalysts heretofore employed.

In carrying out my process I vaporize the naphtha feed stock and heat it to a high conversion temperature, usually within the range of 900 to 1050° F. and preferably about 950 to 1000° F. The naphtha vapors are then contacted with the catalyst which may be in the form of a suspended powder or which may be in a porous bed of granules, either stationary or moving in a continuous operation. When employing a stationary catalyst bed, the practice is to pass the hydrocarbon vapors through the catalyst for a specified reaction period until the catalyst activity is appreciably reduced and thereafter regenerate the catalyst by interrupting the flow of hydrocarbon vapors, purging the catalyst with inert gas, such as steam, and contacting it with a current of air, usually diluted with flue gas to reduce the oxygen concentration. The carbonaceous matter which has accumulated on the catalyst is burned away during regeneration and the catalyst is then in condition for reuse. Care must be taken during the regeneration operation to control the temperature and avoid damaging the catalyst by overheating. A regeneration temperature within the range of about 1000 and 1200° F. is usually satisfactory although higher temperatures, for example, up to 1400° F., may sometimes be employed, depending on the particular catalyst used. The regeneration temperature may be controlled by regulating the amount of oxygen in the regeneration gases and recycling the spent regeneration gases. The spent regeneration gases may be recycled through a cobalt oxide catalyst or other device may be used to burn the carbon monoxide outside of the regenerator, thereby dissipating part of the heat of regeneration. The heat of regeneration may be employed for producing steam or for other useful purposes. Regeneration temperatures may also be controlled in a moving bed or powdered catalyst system by recycling a part of the regenerated catalyst.

The catalyst employed in my process is an aluminum oxide identified herein as "alumina gel." It is made from gelatinous alumina prepared by adding an acid or aluminum salt or both to a solution of an aluminate, preferably an alkali metal aluminate such as sodium aluminate or potassium aluminate. Other water soluble aluminates may be employed such as the aluminates of trimethylamine, triethanolamine, and the tetra alkyl ammonium bases, such as tetra methyl ammonium aluminate, or other quaternary bases, for example, trimethyl benzyl ammonium hydroxide.

The aluminates may be prepared by dissolving hydrated alumina in the various bases. For example, sodium aluminate may be prepared by boiling bauxite in caustic soda solution, preferably under pressure and at an elevated temperature, for example, 250 to 300° F.

In making gelatinous alumina, I carefully add the acid or aluminum salt to the cold aluminate solution, adding just the right amount to obtain the desired hydrogen ion concentration for gelation. This amount is approximately the stoichiometrical proportion. On standing or heating the solution sets to a gel. This gel is broken up and washed with distilled water to remove salts. Washing is particularly important in the case of alkali metal aluminates where it is necessary to remove substantially all of the alkali metal salt from the catalyst. Removal of alkali metal salt such as sodium chloride or sodium sulfate may be facilitated by washing with an ammonium salt or an aluminum salt in dilute solution in which case the alkali metal ions adsorbed on the alumina are displaced by the ammonium or aluminum ions.

The acids employed in preparing gelatinous alumina may be any of the common mineral acids, such as hydrochloric acid, sulfuric acid, sulfurous acid, phosphoric acid, nitric acid, acetic acid, etc. Other less common acids, such as sulfamic acid, may also be employed. The aluminum salts which may be employed for gelling the aluminates may be aluminum chloride, aluminum sulfate, or the alums, for example, sodium, potassium or ammonium alum. When employing an aluminum salt as a coagulant, the aluminum present in the salt as a cation is converted into hydrated aluminum oxide simultaneously with the aluminum occurring as an anion in the aluminate.

The washed alumina gel or gelatinous alumina prepared as above is carefully dried and ignited to remove a large part of the water of hydration and may be employed in this form as a catalyst in my process. However, I prefer to employ it in combination with a promoter metal oxide, more particularly an oxide of a metal of the left subgroups of groups V and VII of the periodic system, especially chromium, molybdenum, tungsten, vanadium, and uranium. The promoter oxide is preferably added to the gelatinous alumina before drying but it may also be incorporated after drying, preferably before igniting. Probably the most convenient method of applying the promoter is by impregnation of the alumina with the ammonium promoter salt such as ammonium chromate, ammonium paramolybdate, ammonium vanadate, or ammonium tungstate. For example, a solution containing 165 parts by weight of ammonium paramolybdate was added to 1000 parts by weight of gelatinous alumina. Alternate suction and pressure were applied to the mixture for a short period in order to obtain complete impregnation of the alumina with the solution. The slurry was finally filtered, and the cake was dried and ignited at 1200° F. for 1 hour.

Other methods which may be employed for applying metal oxide promoters of the V and VI groups to the alumina comprise intimately mixing a freshly precipitated metal oxide with the gelatinous alumina, for example, by milling in a ball mill; applying to the alumina a promoter metal salt, for example, chromium nitrate solution, followed by drying and igniting, with or without precipitation with ammonia; or adding a promoter metal acid, such as chromic acid or molybdic acid, directly to the alumina followed by drying and igniting. The resulting catalyst may be granulated, powdered or pelleted as desired. If pelleted, this is generally done before igniting. If desired, the alumina may be ignited, for example, at 1000 to 1400° F., before adding the promoter oxide.

In conducting the process of reforming naphthas with my improved catalyst, when desired to employ hydrogen which may be introduced with the naphtha vapors, the amount of hydrogen should be about ½ mol to 5 mols, usually about 2 mols per mol of hydrocarbon treated, and the pressure employed, which may be principally hydrogen pressure, is preferably about 50 to 450 pounds per square inch.

In one example a midcontinent virgin heavy naphtha having a knock rating of 35 A. S. T. M. was contacted with the catalyst at 980° F. and 200 pounds per square inch in the presence of 2300 cubic feet of hydrogen per barrel of naphtha (42 gals.). The rate of contact or space velocity was about 2.4 to 2.6 V. H. V. (volumes of liquid naphtha per hour per apparent volume of catalyst). The resulting gasoline had a knock rating of 81 A. S. T. M. This catalyst contained about 6% of molybdenum oxide (MoO₃). Similar results were obtained with another catalyst containing about 10% of chromium oxide (Cr₂O₃) on gelatinous alumina. For comparison, ordinary activated alumina of commerce, similarly impregnated with molybdenum oxide, required a contact time of more than twice as long to produce the same results, i. e., it required a space velocity of about 1 V. H. V.

When employed at lower space velocities my catalyst produces a larger increase in knock rating than normally produced by catalysts made with aluminum oxide of the prior art. The following data show a comparison between two lots of my gelatinous alumina catalyst and one of the most active previously known alumina catalysts, all promoted with about 6% of molybdenum oxide.

|  | Alumina Gel | | Commercial "Activated Alumina" |
| --- | --- | --- | --- |
| Space Velocity, V. H. V. | 0.98 | 1.01 | 1.09 |
| Temperature ° F. | 971 | 970 | 976 |
| Pressure, pounds per square inch | 200 | 200 | 200 |
| Hydrogen, mol ratio | 3 | 3 | 3 |
| Carbon, weight per cent | 1.3 | 0.71 | 0.34 |
| Liquid Yield, volume per cent | 70.4 | 70.1 | 85.0 |
| Knock Rating, A. S. T. M. | 90.2 | 87 | 80.8 |

In general, the amount of promoter oxide employed in my gelatinous alumina catalyst is about 5 to 25%. The space velocity is about 1 to 4 V. H. V. The reaction is endothermic, therefore requiring the addition of extraneous heat for the introduction of the hydrocarbon vapors at a temperature somewhat above the desired reaction temperature. Thermal conversion in the absence of catalyst should be avoided as it results in a lower knock rating and an increase in the amount of carbon deposited on the catalyst. Although hydrogen is introduced into the process, the process is not a hydrogenation process but rather a dehydrogenation process under the conditions herein described and hydrogen is produced in excess of that employed. Production of hydrogen comes principally from the dehydrogenation of paraffin hydrocarbons and their cyclization to produce aromatic hydrocarbons. Olefins and cycloparaffins are similarly dehydrogenated to aromatic hydrocarbons. The fixed gases produced in the process are, therefore, rich in hydrogen and may be employed with or without purification to supply the hydrogen needed in the reaction.

Having thus described my process what I claim is:

1. The process of reforming low knock rating gasoline to produce high knock rating motor fuels which comprises vaporizing said low knock rating gasoline and contacting the vapors at conversion temperatures and in the presence of hydrogen with a catalyst consisting essentially of alumina and a promoter prepared from gelatinous alumina made by coagulating a solution of an alkali metal aluminate with controlled addition of acid in stoichiometrical proportions, then washing free of alkali metal salts, said alumina being promoted with a small amount of an oxide of a Group VI metal, regulating the space velocity within the range of about 2 to 5 volumes of oil per hour per volume of catalyst, regulating the hydrogen concentration within the range of about 0.5 to 5 mols of hydrogen per mol of hydrocarbon treated and recovering gasoline from the products of said reaction by fractional distillation.

2. The process of claim 1 wherein the fixed gases, including hydrogen obtained from the process, are recycled to the reforming reaction.

3. The process of producing gasoline of high knock rating from low knock rating naphtha which comprises contacting the vapors of said naphtha at a high conversion temperature with a solid, porous, refractory catalyst consisting essentially of aluminum oxide gel promoted with a minor amount of an oxide of a metal selected from the class consisting of chromium, molybdenum, tungsten, vanadium and uranium, said aluminum oxide gel having been prepared by gelling a solution of an alkali metal aluminate with controlled addition of acid in stoichiometrical proportions, thereby gelatinizing said aluminate then washing free of alkali metal salts, drying and igniting the resulting gel.

4. The process of reforming low knock rating petroleum naphtha which comprises vaporizing said naphtha and contacting the vapors at a high conversion temperature with a catalyst consisting essentially of alumina gel prepared by gelling a sodium aluminate solution with controlled addition of acid in stoichiometrical proportions, washing the resulting hydrated alumina gel free of sodium salt, incorporating as a promoter about 5 to 25% of an oxide of a group VI metal, drying and igniting the resulting mixture.

5. The process of claim 4 wherein the promoter metal oxide is chromium oxide.

6. The process of claim 4 wherein the promoter metal oxide is molybdenum oxide.

7. The process of claim 4 wherein said promoting metal oxide is incorporated in said alumina gel by milling a compound of said promoter metal with the hydrated alumina gel and thereafter drying the product.

EDGAR C. PITZER.

REFERENCES CITED

The following references are of record in the file of this patent:

UNITED STATES PATENTS

| Number | Name | Date |
|---|---|---|
| 2,141,185 | Houdry | Dec. 27, 1938 |
| 2,184,235 | Groll et al. | Dec. 19, 1939 |
| 2,183,591 | Schulze | Dec. 19, 1939 |
| 2,096,769 | Tropsch | Oct. 26, 1937 |
| 2,279,703 | Bradley et al. | Apr. 14, 1942 |
| 2,283,172 | Bates | May 19, 1942 |
| 2,253,285 | Connolly | Aug. 19, 1941 |
| 2,257,723 | Arveson | Oct. 7, 1941 |
| 2,273,338 | Thomas | Feb. 17, 1942 |
| 2,289,716 | Marschner | July 14, 1942 |
| 2,300,106 | Connolly | Oct. 27, 1942 |
| 2,315,024 | Sturgeon | Mar. 30, 1943 |
| 2,278,223 | Sturgeon | Mar. 31, 1942 |
| 2,348,599 | Brown | May 9, 1944 |